United States Patent
Dutta

(10) Patent No.: US 7,030,549 B2
(45) Date of Patent: *Apr. 18, 2006

(54) DISPLAY DEVICE HAVING REDUCED COLOR SHIFT DURING LIFE

(75) Inventor: Arunava Dutta, Winchester, MA (US)

(73) Assignee: Osram Sylvania Inc., Danvers, MA (US)

( * ) Notice: Subject to any disclaimer, the term of this patent is extended or adjusted under 35 U.S.C. 154(b) by 244 days.
This patent is subject to a terminal disclaimer.

(21) Appl. No.: 10/344,150

(22) PCT Filed: Aug. 9, 2001

(86) PCT No.: PCT/US01/24991

§ 371 (c)(1), (2), (4) Date: Nov. 20, 2003

(87) PCT Pub. No.: WO02/15215

PCT Pub. Date: Feb. 21, 2002

(65) Prior Publication Data
US 2004/0095058 A1    May 20, 2004

Related U.S. Application Data

(60) Provisional application No. 60/224,477, filed on Aug. 10, 2000.

(51) Int. Cl.
*H01J 1/62* (2006.01)

(52) U.S. Cl. .................. 313/487; 313/484; 313/485

(58) Field of Classification Search .......... 313/485
See application file for complete search history.

(56) References Cited

U.S. PATENT DOCUMENTS 3,602,757 A * 8/1971 Wachtel ............. 313/487
4,000,436 A   12/1976 Toryu et al.
4,751,426 A * 6/1988 Hoffman et al. ........... 313/487
5,105,122 A   4/1992 Konings et al.
5,471,113 A   11/1995 De Backer et al.
5,604,396 A   2/1997 Watanabe et al.
5,714,836 A * 2/1998 Hunt et al. ............... 313/487
5,801,483 A * 9/1998 Watanabe et al. ......... 313/485
5,859,496 A   1/1999 Murazaki et al.
6,045,721 A   4/2000 Zachau et al.
6,777,867 B1 * 8/2004 Mishra et al. ............ 313/487

FOREIGN PATENT DOCUMENTS

JP     63-37459      4/1980
JP     5174790 A  *  7/1993

* cited by examiner

*Primary Examiner*—Karabi Guharay
*Assistant Examiner*—Sikha Roy
(74) *Attorney, Agent, or Firm*—Carlo S. Bessone

(57) ABSTRACT

A display device, which can be a plasma display panel or a highly loaded fluorescent lamp, comprises a hollow, translucent glass body containing a medium capable of generating at least several wavelengths of UV radiation. A plurality of phosphors is disposed on the inside surface of the glass body and emits visible radiation upon exposure to the UV radiation. The blue BAM phosphor is most subject to degradation upon long-term exposure to at least one UV wavelength that may be available. The blue BAM along with the red YOE and green CAT phosphors are installed adjacent the inside surface of the glass body to form a first layer; and, the red YOE phosphor is disposed on the first layer to form a second layer, the second layer not being subject to long-term UV degradation. In some embodiments, a layer of alumina may be deposited under the first phosphor layer.

10 Claims, 2 Drawing Sheets

US 7,030,549 B2

DISPLAY DEVICE HAVING REDUCED COLOR SHIFT DURING LIFE

This application claims priority from Provisional Patent Application No. 60/224,477, filed Aug. 10, 2000.

TECHNICAL FIELD

This invention relates to display devices such as fluorescent lamps, plasma display devices and more particularly to such devices that are energized by electromagnetic radiation of wavelengths that belong to the ultra violet region or the vacuum ultraviolet region. Still more particularly it relates to highly loaded electrodeless fluorescent lamps. By highly loaded is meant lamps having a wall loading exceeding 1000 W/m$^2$ or having a discharge current of equal to or greater than 2 amperes.

BACKGROUND ART

Electrodeless lamps, such as those shown in U.S. Pat. No. 5,834,905, employ a hollow glass envelope containing mercury vapor and a buffer gas and having a phosphor coating on the inside surface of the glass body. The phosphor is a substantially homogeneous mixture of usually three materials having emission spectra in different parts of the visible spectrum and blended to emit white light. In preferred forms of this lamp the blend includes three phosphors, namely, red emitting $Y_2O_3$:$Eu^{3+}$, green emitting (Ce, Tb)$MgAl_{11}O_{19}$:$Ce^{3+}$, $Tb^{3+}$ and a blue emitting selected from the group of $BaMgAl_{10}O_{17}$:$Eu^{2+}$ or $BaMg_2Al_{16}O_{27}$:$Eu^{2+}$. These lamps are designed for extremely long life, i.e., in the neighborhood of 100,000 hours. The long life of these lamps has given rise to problems involving a color shift in the emitted spectra. It has been determined that this color shift is caused by degradation of some of the lamp phosphors during life, the degradation probably being caused by the long exposure to at least one of several wavelengths of ultraviolet radiation generated during operation of the lamp.

Plasma display devices also use similar phosphors some of which can degrade over the life of the display due to long exposure to at least one of several wavelengths of vacuum ultraviolet radiation (140–200 nm). For example, a PDP display device may use $Y_2O_3$: $Eu^{3+}$ or (Y, Gd)$BO_3$:$Eu^{3+}$ red phosphors, $Zn_2SiO_4$:$Mn^{2+}$ green phosphor and $BaMg_2Al_{16}O_{27}$:$Eu^{2+}$ blue phosphor.

DISCLOSURE OF INVENTION

It is, therefore, an object of the invention to obviate the disadvantages of the prior art and to improve the performance and minimize the color shift of such lamps with time.

These objects are accomplished, in one aspect of the invention by a display device comprising a hollow, translucent glass body containing a medium capable of generating at least one wavelength of UV radiation. A plurality of phosphors is disposed on the inside surface of the glass body, these phosphors emitting visible radiation upon exposure to the UV radiation. At least one of the plurality of phosphors is subject to degradation upon long-term exposure to the wavelength of UV radiation. The at least one of the plurality of phosphors subject to degradation is installed adjacent the inside surface of the glass body to form a first layer; and the remainder of the plurality of phosphors are disposed on the first layer to form a second layer. The second layer is not subject to the long-term degradation upon exposure to said UV radiation.

These objects are additionally accomplished, in another aspect of the invention, by the provision of a highly loaded fluorescent lamp comprising a hollow, translucent glass body containing a medium capable of generating at least several wavelengths of UV radiation. A plurality of phosphors is disposed on the inside surface of the glass body, the plurality of phosphors emitting visible radiation upon exposure to the UV radiation. At least one of the plurality of phosphors is subject to degradation upon long-term exposure to one of the at least one of several wavelengths of UV radiation. The at least one of the plurality of phosphors subject to degradation is installed adjacent the inside surface of the glass body to form a first layer; and, the remainder of the plurality of phosphors are disposed on the first layer to form a second layer, the second layer not being subject to long-term degradation upon exposure to the UV radiation.

The deposition of the more stable phosphor on top of the least stable phosphor provides adequate protection of the least stable phosphor during the life of the lamp, allowing the lamp to more nearly provide its designed color output during its long life.

BEST MODE FOR CARRYING OUT THE INVENTION

For a better understanding of the present invention, together with other and further objects, advantages and capabilities thereof, reference is made to the following disclosure and appended claims in conjunction with the above-described drawings.

Figure 1:
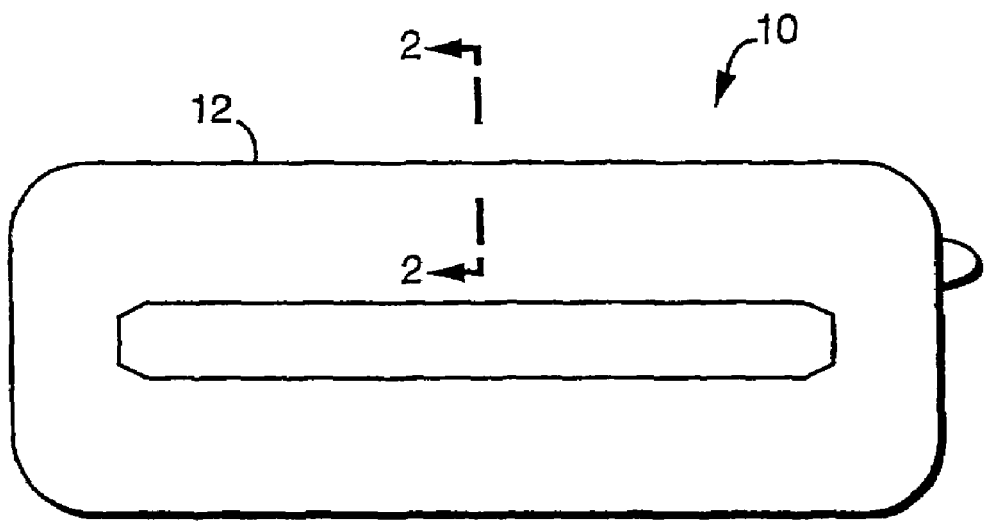
FIG. 1 is a diagrammatic plan view of an electrodeless fluorescent lamp employing the invention.

Referring now to the drawings with greater particularity, there is shown in FIG. 1 a highly loaded electrodeless fluorescent lamp 10 with its external power sources omitted. The lamp 10 has a hollow glass body 12, which contains a medium capable of generating at least several wavelengths of ultraviolet radiation. The medium can comprise mercury vapor and a buffer gas, usually a noble gas such as krypton; however, argon or other equivalent gases can be used.

Additionally, the inside surface 14 of body 12 of prior art lamps has been coated with a substantially homogeneous blend of three phosphors whose blended red, green and blue emission provides a balanced white light output. Emission from the phosphors is stimulated by exposure to the ultraviolet radiation, particularly at 185 nm and 254 nm, which is provided during lamp operation by the mercury vapor. In a preferred embodiment of this invention, the red emitting phosphor is $Y_2O_3$:$Eu^{3+}$ (hereinafter, YOE) the green emitting phosphor is (Ce, Tb)$MgAl_{11}O_{19}$:$Ce^{3+}$, $Tb^{3+}$ (hereinafter, CAT) and the blue emitting phosphor is selected from the group of $BaMgAl_{10}O_{17}$:$Eu^{2+}$ or $BaMg_2Al_{16}O_{27}$:$Eu^{2+}$ (hereinafter, BAM).

As above noted, it has been discovered that during the long lifetime of these lamps, an undesirable color shift can occur For example, the x coordinate of color can shift by about 0.015 to 0.02 between 100 and 5000 hours for a highly loaded electrodeless lamp with an initial color temperature of 3500K and the y coordinate of color can shift by about 0.01 to 0.015 in the same time. It is believed that this color shift is caused by a degradation of the blue emitting phosphor due to long exposure to particularly the 185 nm radiation. Ion bombardment is also suspected of being another cause. Additionally, oxidation of the $Eu^{2+}$ could be occurring during lamp processing.

The color shift problem of these highly loaded lamps can be eliminated or substantially reduced by applying the phosphors in layers with the blue BAM phosphor being applied first and a blend of the CAT and YOE phosphors being applied over it. This is particularly applicable since the YOE is a very stable material and attenuates the damaging 185 nm UV radiation thus reaching the BAM.

In some embodiments of these lamps it is often the case where a thin coating of alumina is first applied to the inside glass surface to minimize Hg diffusion into the glass and also to reflect 254 nm UV photons that have not been absorbed by the phosphor layer back into the phosphor layer for another chance at absorption and re-emission as a visible photon. In those cases the BAM is applied over (on top of) the alumina coating.

Figure 2:
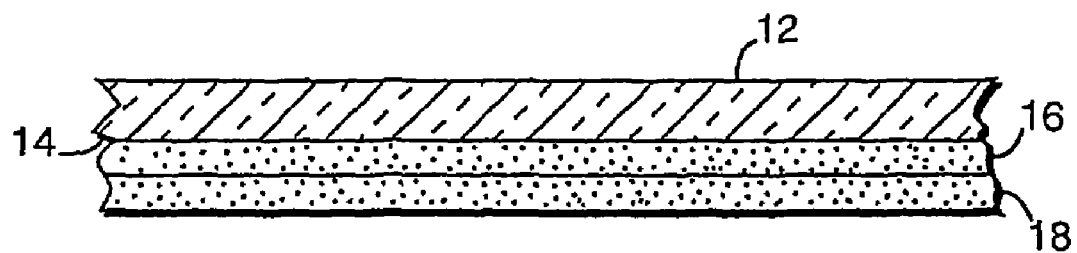
FIG. 2 is a cross-section taken along the line 2—2 of FIG. 1.

The first embodiment is shown in FIG. 2 wherein the inside surface 14 of body 12 has applied thereto a first layer 16 of a BAM phosphor and has applied over it a second layer 18 of a blend of CAT and YOE phosphors.

Figure 3:
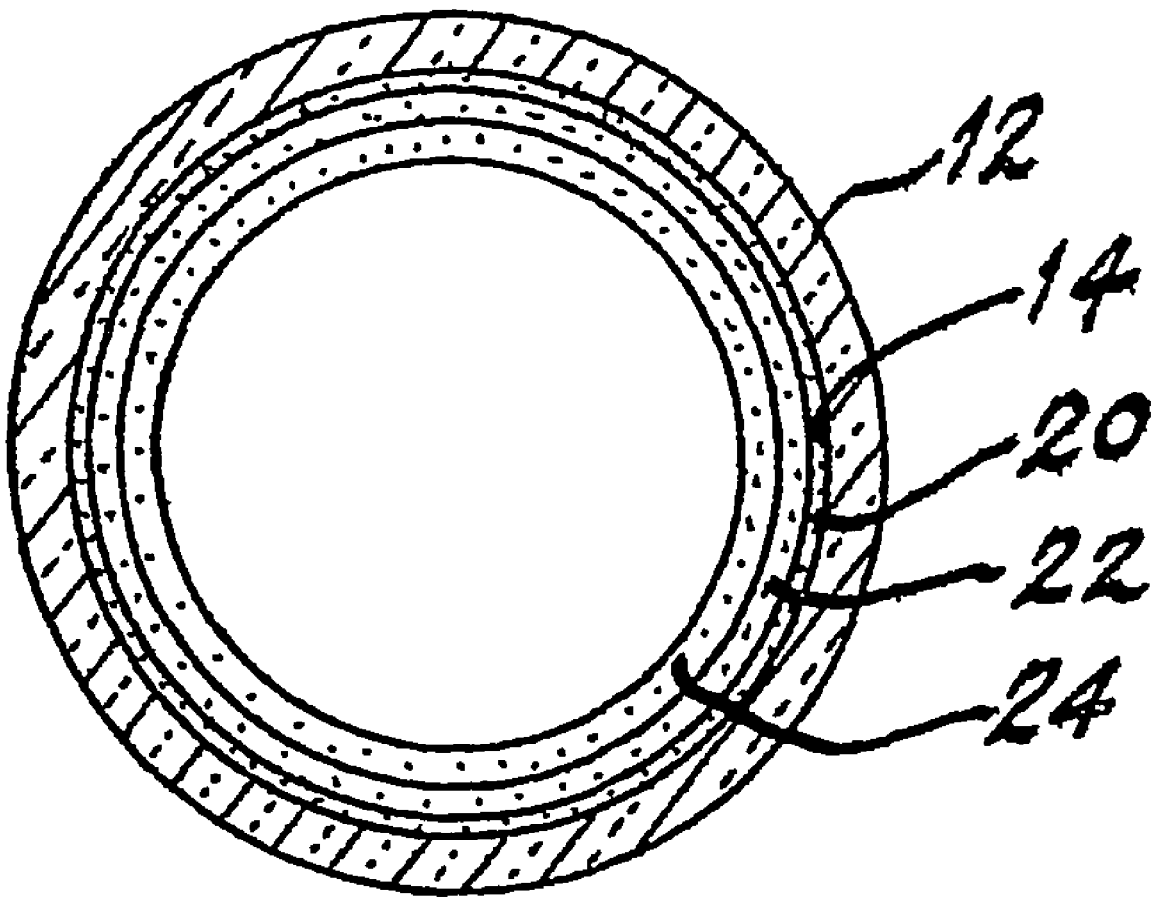
FIG. 3 is a cross-sectional view of an alternate embodiment.

The latter embodiment is shown in FIG. 3 wherein a first layer 20 is alumina, a second layer 22 is the BAM and a third layer 24 is a mixture of the YOE and the CAT.

In another embodiment, the first phosphor coat can contain BAM, CAT and YOE while the top layer contains just YOE.

In order for a lamp with this new construction to have an initial color point comparable to the existing lamp it will be necessary to adjust the specific weight of the phosphor layers. For example, in a current highly loaded electrodeless lamp having a color temperature of 4100K, the single phosphor layer has a weight of 3.90 $mg/cm^2 \pm 10\%$, with the phosphors broken down as 54.5% red YOE, 34.5% green CAT and 11% blue BAM (all percentages by weight).

To provide a lamp with the same 4100 K color temperature using multiple phosphor layers, the specific weight of the blue BAM phosphor will preferably be between 0.40 and 0.90 $mg/cm^2$ while that of the top layer, which includes the red YOE and green CAT phosphors, will be adjusted to be between 2.5 to 3.5 $mg/cm^2$. To make lamps having different color temperatures, obviously the coating layer total powder loadings will have to be optimized accordingly. In addition, the ratio of the various phosphors in any coating layer will need to be optimized. Other necessary adjustments may have to be made as deemed necessary by people skilled in the art.

While disclosed above in regard to fluorescent lamps this technique will be applicable to plasma display panels where similar phosphors are employed but are subjected to radiation from a xenon discharge. These display panels have also been noted to encounter the same color shift, mainly due to degradation of the blue BAM phosphor which degrades due to long term exposure to the broadband Xe excitation from 147 nm to 200 nm peaking at 174 nm. The mechanism of degradation of the BAM in PDP display devices could be due to oxidation of the surface europium.

While there have been shown and described what are at present considered to be the preferred embodiments of the invention, it will be apparent to those skilled in the art that various changes and modification can be made herein without departing from the scope of the invention as defined by the appended claims.

What is claimed is:

1. A display device comprising:
    a hollow, translucent glass body containing a medium capable of generating at least one wavelength of UV radiation;
    a plurality of phosphors disposed on the inside surface of said glass body, said phosphors emitting visible radiation upon exposure to said UV radiation, at least one of said plurality of phosphors being subject to degradation upon long-term exposure to said wavelength of UV radiation;
    said at least one of said plurality of phosphors subject to degradation being installed adjacent said inside surface of said glass body to form a first layer containing BAM, CAT and YOE; and
    the remainder of said plurality of phosphors being disposed on said first layer to form a second layer consisting essentially of YOE, said second layer not being subject to long-term degradation upon exposure to said UV radiation.

2. The display device of claim 1 wherein said display device is a fluorescent lamp.

3. The display device of claim 2 wherein said fluorescent lamp is an electrodeless lamp.

4. The display device of claim 3 wherein said fluorescent lamp is a highly loaded electrodeless fluorescent lamp.

5. The display device of claim 1 wherein said plurality of phosphors comprises individual phosphors emitting in the red, green and blue portions of the visible spectrum.

6. The display device of claim 5 wherein said blue emitting phosphor is selected from the group of $BaMgAl_{10}O_{17}{:}Eu^{2+}$ or $BaMg_2Al_{16}O_{27}{:}EU^{2+}$.

7. The display device of claim 6 wherein said $BaMgAl_{10}O_{17}{:}EU^{2+}$ or $BaMg_2Al_{16}O_{27}{:}Eu^{2+}$ is the phosphor subject to degradation.

8. The display device of claim 7 wherein said remainder of said phosphors comprise $Y_2O_3{:}Eu^{3+}$, $(Ce, Tb)MgAl_{11}O_{19}{:}Ce^{3+}, Tb^{3+}$.

9. The display device of claim 3 wherein said display device is a plasma display panel.

10. The display device of claim 1 wherein a thin coating of alumina is disposed on the inside surface of said glass body.

* * * * *